Jan. 21, 1947.  L. G. TUBBS  2,414,570
REGULATING SYSTEM
Filed June 29, 1944
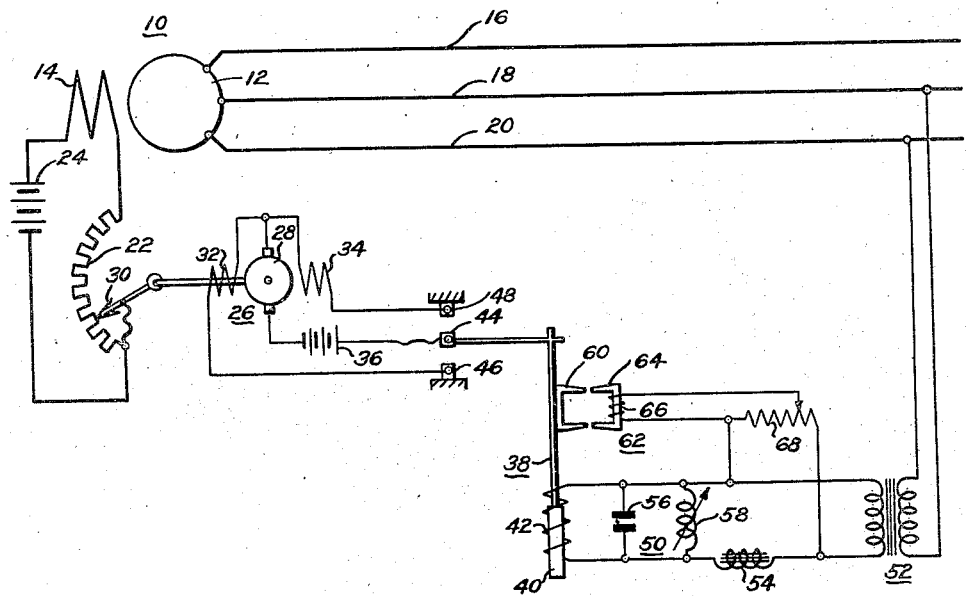
WITNESSES:
Helen Gumm
Leon J. Taza
INVENTOR
Lester G. Tubbs.
BY
James N. Ely
ATTORNEY Patented Jan. 21, 1947

2,414,570

UNITED STATES PATENT OFFICE 2,414,570

REGULATING SYSTEM

Lester G. Tubbs, Wilkinsburg, Pa., assignor to Westinghouse Electric Corporation, East Pittsburgh, Pa., a corporation of Pennsylvania Application June 29, 1944, Serial No. 542,733

5 Claims. (Cl. 171—119)

This invention relates to regulating systems.

In regulating systems which utilize a voltage relay which is responsive to a change in operating conditions to effect a regulating operation, it is common practice to make adjustments in the relay for changes of voltage balance or in the operating band of the relay by moving physical parts of the relay, such as by changing the tension on the springs, changing the location of the weights, or by changing the air gaps by turning screws which are a part of the relay. The relays are quite sensitive and it is found that such adjustments of the relay in commercial installations, unless made by highly skilled personnel, often renders the relay inoperative or renders the system unstable.

An object of this invention is to provide, in a regulating system utilizing a voltage relay, for remotely adjusting the energization of the relay to a predetermined value for different regulated operating conditions.

Another object of this invention is to provide in a regulating system utilizing a voltage relay and magnetic means for magnetically tending to maintain the relay in a balanced or neutral position, for remotely adjusting the magnetic pull of the magnetic means and the energization of the relay to maintain predetermined values for different regulated operating conditions.

Other objects of this invention will become apparent from the following description when taken in conjunction with the accompanying drawing, the single figure of which is a diagrammatic representation of apparatus and circuits illustrating an embodiment of this invention.

Referring to the drawing, this invention is illustrated as applied to a three-phase dynamoelectric machine 10 having an armature winding 12 and a field winding 14, the dynamoelectric machine being connected to supply a load circuit represented by the conductors 16, 18 and 20. The excitation of the field winding 14 is controlled by adjusting the setting of a variable rheostat 22 which is connected in series circuit with a battery 24 and the field winding 14.

In the embodiment illustrated, the rheostat 22 may be adjusted by operation of a motor 26, the armature 28 of which is mechanically connected to operate the movable contact member 30 of the rheostat 22 to either shunt or connect more sections of the rheostat in the field winding circuit, depending upon the direction of rotation of the motor 26. The motor 26 is provided with two field windings 32 and 34 which, when selectively energized from a battery 36, determine the direction of rotation of the motor.

In order to control the selective connection of the field windings 32 and 34 to the battery 36, a relay 38 is provided. The relay 38 comprises a movable armature member 40 and a winding 42 disposed about the core of the armature member, the armature member carrying a contact member 44 disposed to be actuated into engagement with one or the other of the spaced stationary contact members 46 and 48 connected to field windings 32 and 34, respectively. The energizing winding 42 of the relay 38 is connected through a static circuit 50 and a transformer 52 across the conductors 18 and 20, so that a change in the voltage of the dynamoelectric machine 10 effects a change in the energization of the winding 42.

The static circuit 50 in this instance consists of a reactor 54 connected in series circuit with the relay winding 42 and the secondary winding of the transformer 52 and a capacitor 56 connected in parallel circuit across the relay winding 42, the reactor 54 and capacitor 56 co-operating to deliver a constant current and also to compensate for changes in resistance of the circuit caused by changes in ambient temperature and for small changes in frequency, such as are likely to be encountered in generator systems. As such compensation is well known and forms no part of the claimed invention, the theory and functioning of the compensating apparatus need not be further described in this embodiment.

As the regulating system is to be employed for regulating for different magnitudes of alternating voltage, it is required that the relay be balanced so that the contact member 44 will be in a neutral position for each of the magnitudes of alternating voltage which is to be regulated. In order to accomplish this, the winding 42 must be energized a predetermined amount which is consistent for the different regulated magnitudes. Such predetermined energization of the winding 42 may be obtained in accordance with this invention by connecting an adjustable linear reactor 58 in parallel circuit with the relay winding 42 for shunting a controllable amount of current from the relay winding. The linear reactor 58 may readily be adjusted by designing it so that the air gap, not shown, in its magnetic circuit may be varied to control its inductive reactance. Thus as it is desired to change the regulated magnitude of the alternating voltage to some other regulated value, the predetermined energization of the relay 38 to maintain the contact member 44 in its neutral position is obtained by adjusting the air gap, not shown, of the reactor 58 to control the current flow in the relay winding 42 so that regardless of the value of voltage which is to be regulated and which is impressed on the transformer 52, the winding 42 of the relay 38 is so energized as to maintain the contact member 44 in its neutral position. Thus by providing the reactor 58, a remote adjustment of the current flow through the winding 42 is obtained so that a constant predetermined energization of the relay winding 42 may be obtained for any magnitude of voltage which is to be regulated.

In systems of the type described, it is desirable to provide for maintaining the relay 38 in a balanced or neutral position for slight changes from the regulated magnitude. These slight changes usually constitute a relatively narrow band of voltage such as up to one or two volts increase or decrease from the regulated magnitude. In the embodiment illustrated, the armature member of the relay 38 carries a U-shaped member 60 capable of being magnetically attracted. Associated with the member 60 is an electromagnet 62 formed of a U-shaped core member 64 having its poles adjacent the tips of the U-shaped member 60 and a winding 66 disposed to be so energized as to magnetically tend to hold or maintain the armature member 40 of the relay 38 in a given neutral position. The winding 66 is connected through a resistor or potentiometer 68 across the control voltage means, such as the transformer 52, so that by adjusting the resistor or potentiometer 68, the magnetic pull of the electromagnet 62 may be remotely adjusted. In practice, the winding 66 is so energized that the magnetic pull of the electromagnet 62 co-operates with the relay 38 to determine the narrow band of voltage for which it is required to maintain the armature member 40 in the neutral or balanced position, as shown, at the regulated magnitude of voltage.

In operation, with the dynamoelectric machine 10 being driven by any suitable prime mover, not shown, a predetermined voltage exists across the conductors 16, 18 and 20 and assuming that the voltage across conductors 18 and 20 is of the magnitude which it is desired to regulate, the regulating system is in the balanced condition shown. That is, the relay 38 is so energized and the winding 66 is so energized as to tend to maintain the contact member 44 in its neutral position out of engagement with either of the contact members 46 or 48.

If the voltage across conductors 18 and 20 should decrease a slight amount within the operating band of voltage from the regulated magnitude, the change in the energization of the winding 42 is insufficient to overcome the magnetic pull of the electromagnet 62 to effect a movement of the contact member 44. If, however, the decrease in voltage is such as to fall outside the limits of the operating band of voltage, then the energization of the winding 42 is so decreased that the pull of gravity overcomes the magnetic pull of the electromagnet 62. When this occurs, the contact member 44 is moved into engagement with the contact member 46 to close the field winding circuit to so energize the winding 32 as to effect an operation of the motor 26 to operate the contact member 30 of the field rheostat 22 in a direction to shunt additional sections of the rheostat 22. The shunting of the sections of the field rheostat 22 effectively increases the excitation of the field winding 14 whereby the voltage of the dynamoelectric machine 10 is increased to its regulated value.

If, on the other hand, the voltage change is an increase from the regulated magnitude outside the limits of the operating band, the winding 42 of the relay 38 is so energized as to overcome the magnetic pull of the electromagnet 62 and to actuate the contact member 44 into engagement with the contact member 48. The engagement of the contact members 44 and 48 closes a circuit through the field winding 34 of the motor 26 to effect an operation of the motor to actuate the contact member 30 of the rheostat in a direction to connect additional sections of the rheostat 22 in the field winding circuit whereby the excitation of the field winding 14 is so decreased as to effect a decrease in the voltage output of the dynamoelectric machine 10 to the regulated value.

If for some reason, it is desired to regulate the operation of the dynamoelectric machine 10 at some other magnitude of voltage, such as, for example, an increase in the magnitude of voltage, then by simply adjusting the air gap of the linear resistor 58, additional current can be so shunted from the relay winding 42 as to maintain the energization of the relay 38 at a constant predetermined value which will hold the contact member 44 in a balanced or neutral position for the new regulated magnitude of the alternating voltage. At the same time, the magnetic pull of the electromagnet 62 may be adjusted to render the magnetic pull the same for the new regulated magnitude as it was for the old regulated magnitude by simply adjusting the resistor or potentiometer 68 to decrease the current flow through the winding 66 of the electromagnet 62.

If, on the other hand, the new regulated magnitude should be lower than the original regulated magnitude of voltage, then the air gap of the reactor 58 may be so adjusted that the reactor 58 shunts less current from the winding 42 of the relay 38, whereby the energization of the relay 38 is maintained substantially constant at the predetermined value necessary for holding the contact member 44 in a neutral or balanced position and the resistor or potentiometer 68 may be adjusted to permit more current to flow through the winding 66 whereby the electromagnet 62 is adjusted to maintain substantially constant the magnetic pull on the member 60 for the new regulated magnitude of voltage.

It is evident that in the system described, the system may be rendered operative for any number of different regulated magnitudes of voltage by a simple remote adjustment of a reactor and a resistor or potentiometer whereby the voltage relay remains quite sensitive and the system is operative for a number of different regulated magnitudes of voltage. By utilizing the remote adjustments as described, the relay proper may be located where it will be accessible only to persons authorized and competent to make further adjustments and repairs thereto, if such should be necessary, thereby removing possibilities of damage to the relay by adjustments by unskilled personnel.

Although this invention is described with reference to a particular embodiment thereof, it is, of course, not to be limited thereto except in so far as is necessitated by the scope of the appended claims.

I claim as my invention:

1. In a regulating system for an alternating voltage which is to be maintained at different magnitudes for different operating conditions, in combination, apparatus for controlling the magnitude of the alternating voltage, means disposed to be energized for effecting movement thereof to different positions for controlling the operation of the apparatus, means connected to provide a control voltage which is proportional to the alternating voltage, a control circuit connected between the control voltage means and the control means for the apparatus for controlling the energization and positioning of the control means, an adjustable means connected in the control circuit to effect a predetermined energization of the control means for different magnitudes of the alternating voltage which are to be regulated, and means magnetically associated with the control means disposed to magnetically tend to maintain the control means in the position assumed in response to the predetermined energization thereof, the magnetic means being remotely adjustable to maintain a substantially constant magnetic pull on the control means for the different magnitudes of the alternating voltage which are to be regulated, the magnetic means co-operating with the control means to determine the change from the predetermined energization of the control means necessary to effect a movement thereof to an operating position to control the operation of the apparatus.

2. In a regulator for an alternating voltage which is to be maintained at different magnitudes for different operating conditions, in combination, apparatus for controlling the magnitude of the alternating voltage, a relay having a winding disposed to be energized and an armature member disposed for movement to different positions in response thereto for controlling the operation of the apparatus, means for providing a control voltage which is proportional to the alternating voltage, a control circuit connected between the relay winding and the control voltage means for controlling the energization of the winding and thereby control the position of the relay armature member, an adjustable means connected in the control circuit to effect a predetermined energization of the relay winding for different magnitudes of the alternating voltage which are to be regulated, and means disposed to tend to magnetically maintain the relay armature member in the position assumed in response to the predetermined energization of the relay winding, the magnetic means being remotely adjustable to maintain a substantially constant magnetic pull on the armature member for the different magnitudes of the alternating voltage which are to be regulated, the magnetic means cooperating with the relay to determine the change from the predetermined energization of the relay winding necessary to effect a movement of the relay armature member to control the operation of the apparatus.

3. In a regulator for an alternating voltage which is to be maintained at different magnitudes for different operating conditions, in combination, apparatus for controlling the magnitude of the alternating voltage, a relay having a winding disposed to be energized and an armature member disposed for movement in response to the energization of the winding for controlling the apparatus, means for providing a control voltage which is proportional to the alternating voltage, a control circuit connected between the relay winding and the control voltage means for controlling the energization of the winding and thereby control the position of the relay armature member, the control circuit including a linear reactor connected in parallel circuit with the relay winding to effect a predetermined energization of the relay at the regulated magnitude of the alternating voltage, the linear reactor being adjustable for maintaining the predetermined energization of the relay for different magnitudes of the alternating voltage which are to be regulated, and means disposed to tend to magnetically maintain the relay armature member in the position assumed in response to the predetermined energization of the relay winding, the magnetic means being remotely adjustable to maintain a substantially constant magnetic pull on the armature member for the different magnitudes of the alternating voltage which are to be regulated, the magnetic means co-operating with the relay winding to determine the change from the predetermined energization of the relay winding necessary to effect a movement of the relay armature member to control the operation of the apparatus.

4. In a regulating system for an alternating voltage which is to be maintained at different magnitudes for different operating conditions, in combination, apparatus for controlling the magnitude of the alternating voltage, means disposed to be energized for effecting movement thereof to different positions for controlling the operation of the apparatus, means connected to provide a control voltage which is proportional to the alternating voltage, a control circuit connected between the control voltage means and the control means for the apparatus for controlling the energization and positioning of the control means, an adjustable means connected in the control circuit to effect a predetermined energization of the control means for different magnitudes of the alternating voltage which are to be regulated, means connected to the control voltage means disposed to tend to magnetically maintain the control means in the position assumed in response to the predetermined energization thereof, and means connected in circuit with the magnetic means for remotely adjusting the magnetic pull thereof to maintain the pull substantially constant for the different magnitudes of the alternating voltage which are to be regulated, the magnetic means co-operating with the control means to determine the change from the predetermined energization of the control means necessary to effect a movement thereof to an operating position to control the operation of the apparatus.

5. In a regulating system for an alternating voltage which is to be maintained at different magnitudes for different operating conditions, in combination, apparatus for controlling the magnitude of the alternating voltage, means disposed to be energized for effecting movement thereof to different positions for controlling the operation of the apparatus, means connected to provide a control voltage which is proportional to the alternating voltage, a control circuit connected between the control voltage means and the control means for the apparatus for controlling the energization and positioning of the control means, an adjustable means connected in the control circuit to effect a predetermined energization of the control means for different magnitudes of the alternating voltage which are to be regulated, means connected to the control voltage means disposed to tend to magnetically maintain the control means in the position assumed in response to the predetermined energization thereof, and means connected in circuit with the magnetic means for adjusting the magnetic pull thereof to maintain the pull substantially constant for the different magnitudes of the alternating voltage which are to be regulated, the magnetic means co-operating with the control means to determine the change from the predetermined energization of the control means necessary to effect a movement thereof to an operating position to control the operation of the apparatus.

LESTER G. TUBBS.